US006560207B1

(12) United States Patent
Kimura et al.

(10) Patent No.: US 6,560,207 B1
(45) Date of Patent: May 6, 2003

(54) SYNCHRONOUS CIRCUIT OF FM MULTIPLEX BROADCASTING RECEIVER

(75) Inventors: Kazuhiro Kimura, Fukaya (JP); Yutaka Hirakoso, Gunma-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/255,525

(22) Filed: Feb. 22, 1999

(30) Foreign Application Priority Data

Feb. 24, 1998 (JP) .......................................... 10-042376
Feb. 24, 1998 (JP) .......................................... 10-042377
Feb. 25, 1998 (JP) .......................................... 10-043577

(51) Int. Cl.[7] ............................. H04L 7/00; H04B 1/16; H04G 9/04; G01S 5/02

(52) U.S. Cl. ....................... 370/324; 370/350; 370/503; 342/357.12; 455/208

(58) Field of Search ................................ 370/324, 350, 370/503; 455/208, 209; 701/213, 125, 357.12; 342/378, 387; 708/422

(56) References Cited

U.S. PATENT DOCUMENTS 5,719,873 A * 2/1998 Yamashita et al. .......... 370/513
5,995,519 A * 11/1999 Miwa ......................... 370/509
6,363,063 B1 * 3/2002 Kimura et al. .............. 370/350

FOREIGN PATENT DOCUMENTS

JP 11122125 A * 4/1999

* cited by examiner

*Primary Examiner*—Hassan Kizou
*Assistant Examiner*—Ahmed Elallam
(74) *Attorney, Agent, or Firm*—Hogan & Hartson, LLP

(57) ABSTRACT

Data counters and perform a counting operation which is synchronized with the respective timing of receiving multiplex data from a VICS data broadcasting station and a D-GPS data broadcasting station. While receiving the multiplex data from the VICS data broadcasting station, based on an output C2 of the data counter and a BIC detection output BP, block synchronization is detected. When the broadcasting station is switched from the VICS data broadcasting station to the D-GPS data broadcasting station, an output C2 of the data counter is selected in response to a control signal CONT and block synchronization is detected based on an output C2 and an output BP. Further, an output C1 is always inputted to the block counter. Thus, even while receiving the multiplex data from the D-GPS data broadcasting station, frame synchronization of the multiplex data of the VICS data broadcasting station is detected without causing miscounting.

14 Claims, 13 Drawing Sheets

SYNCHRONOUS CIRCUIT OF FM MULTIPLEX BROADCASTING RECEIVER

BACKGROUND OF THE INVENTION

1. Field of the Invention

The present invention relates to a synchronous circuit of an FM multiplex broadcasting receiver for receiving two or more FM signals, each of which includes FM multiplex data.

2. Description of the Related Art

Lately, car-navigation devices which enable a driver to know the present location of his vehicle on a map while driving by detecting the location using a relative or absolute measuring method have widely spread. In such car-navigation devices, two methods of measuring the location of a vehicle are adopted. One is a method of calculating a relative location from the starting point using a gyro sensor, an azimuth sensor, vehicle speed signals or the like, and this method is called self-contained navigation. The other is a method of calculating an absolute location using a global positioning system (GPS) satellite, and is called radio navigation.

Further, it has become possible to obtain road traffic information on the car navigation devices as well as to detect the present location of user's vehicle on the map as described above. More specifically, in Japan the Vehicle Information and Communication System (VICS) data service which is a road traffic information data service using FM multiplex broadcasting was inaugurated in 1996, whereby it is possible for the car-navigation devices to display information concerning traffic jams or other road data (suspension of traffic, road construction or the like) on the map based on the VICS data service.

In calculating an absolute location of a vehicle by a GPS satellite, there is a maximum error of 100 meters due to an intentional deterioration of accuracy which is produced to cope with a clock error of the satellite, an orbital error of the satellite, a delay error caused by an ionized layer, exploitation for criminal activities, or the like. In order to reduce such an error, a differential GPS (D-GPS) system has been developed. In this system, GPS radio waves are received by a reference broadcasting base station which has accurate data of the absolute location of a vehicle, an error between the absolute location and a location calculated based on the GPS radio waves is detected, information data of the error is transmitted to a car-navigation device using broadcasting radio waves, and then the car-navigation device obtains more accurate data concerning the location utilizing the error information data. The D-GPS (error information) data service by FM multiplex broadcasting as described above was inaugurated in 1997. With this service, it is possible to measure the location of a vehicle with a computational error of several meters.

Thus, when an FM multiplex broadcasting receiver of a car-navigation device receives VICS data or D-GPS data, a VICS data broadcasting station has to be switched to a D-GPS data broadcasting station, and vice versa.

FIG. 1 is a block diagram showing a standard FM multiplex broadcasting receiver. As the receiver shown in FIG. 1 is well known, the description thereof will be omitted. Further, FIG. 2 shows actual circuits of a block synchronous circuit and a frame synchronous circuit shown in FIG. 1.

In FIG. 2, a data counter 101 is a 2.88 centesimal counter for block synchronization. It counts a system clock of 16 kHz (a clock having the same frequency as that of a bit rate of FM multiplex data) and outputs a pulse C1 at every one block, namely, at an interval of 18 ms. Numeral 105 is a block identification code (BIC) detection circuit which detects a BIC from the data received. As will be described later, if a BIC is detected by the BIC detection circuit 105 while block synchronization is asynchronous, the data counter 101 will be reset.

Numeral 106 is a timing detection circuit which compares both the generation timing of an output pulse C1 of the data counter 101 and an output pulse BP of the BIC detection circuit 105 and detects accord or disaccord of the generation timing. When both the generation timing of the pulse C1 and the pulse BP accord, an accord pulse P1 is outputted, whereas when both the generation timing disaccord, a disaccord pulse P2 is outputted. Numeral 107 is a block synchronization determination protecting circuit. It outputs an output BL which is "1" representing that block synchronization has been established when the accord pulse P1 is consecutively counted prescribed M times (the number of backward protection M), and outputs an output BL which is "zero" representing that block synchronization has stepped out when the disaccord pulse P2 is consecutively counted prescribed N times (the number of forward protection N).

Numeral 109 is a BIC variable point detection circuit which detects a variable point of the BIC detected. For example, in FM multiplex data which constitute a frame as shown in FIG. 3, the BIC variable point detection circuit detects each variable point of BIC 1 to BIC 3, BIC 4 to BIC 2, BIC 2 to BIC 3, and BIC 4 to BIC 1. Numeral 110 is a 2.72 centesimal counter for frame synchronization and also a block counter which counts the number of blocks by counting output pulses C1 of the data counter 101. Numeral 111 is a frame synchronization detection protecting circuit. It compares a variable point detected by the BIC variable point detection circuit 109 with a variable point calculated based on a count value of the block counter 110. When the variable points accord consecutively a prescribed number of times X (the number of backward protection X), it outputs an output FL which is "1" representing that frame synchronization has been established. When the variable points disaccord consecutively a prescribed number of times Y (the number of forward protection Y), it outputs an output FL which is "0" representing that frame synchronization has been lost. When frame synchronization is asynchronous, detection of a prescribed BIC variable point causes the block counter 110 to be set to a prescribed value. Further, an output FCK from the frame synchronization detection protecting circuit 111 is a frame top signal which is generated when the block counter finishes 2.72 centesimal counting under the condition of frame synchronization.

When the FM multiplex broadcasting receiver shown in FIG. 1 attempts to obtain D-GPS data during the reception of data from a VICS data broadcasting station, the receiving frequency is temporarily switched from the VICS data broadcasting wave to a D-GPS data broadcasting wave and also block synchronization is carried out on the D-GPS data broadcasting wave, and then the receiving frequency is returned to the VICS data broadcasting wave again. Only the D-GPS data composed of two blocks are required for obtaining error information. Therefore, even though VICS data cannot be obtained during the reception of data from the D-GPS data broadcasting station, it is possible to restore the VICS data which could not be received during the reception of data from the D-GPS data broadcasting station by correcting errors in a vertical direction by vertical parity while composing a frame as shown in FIG. 3.

However, in a conventional circuit shown in FIG. 2, when the receiving wave is returned from the D-GPS data broadcasting wave to the VICS data broadcasting wave, slippage of frame synchronization of the VICS data broadcasting wave arises, whereby frame synchronization of the VICS data broadcasting wave is lost. In this situation, it is impossible not only to restore, but also demodulate the VICS data which could not be received during the reception of data from the D-GPS data broadcasting station.

Next, loss of frame synchronization of the VICS data will further be described with reference to a timing chart shown in FIG. 4. Incidentally, in this description it will be assumed that the number of backward protection M of a block synchronous circuit is two, the number of forward protection N of the block synchronous circuit is two, the number of backward protection X of a frame synchronous circuit is two, the number of forward protection Y of the frame synchronous circuit is eight, a station whose receiving frequency is F1 is a VICS data broadcasting station, and a station whose receiving frequency is F2 is a D-GPS data broadcasting station.

In receiving data from the D-GPS data broadcasting station, consecutively received data equivalent to two blocks can secure a practically sufficient error rate merely by a horizontal error correction of the blocks, thereby enabling demodulation and reproduction of the D-GPS data. Therefore, assuming that D-GPS data are received from the D-GPS data broadcasting station during the periods of T12 and T13 shown in FIG. 4, a receiving frequency of the D-GPS data broadcasting station will be switched during the periods of T7 through T14 (receiving frequency). Further, timing of data transmission from the VICS data broadcasting station is illustrated on the basis of a BIC in the data (transmission data F1). Similarly, timing of data transmission from the D-GPS data broadcasting station is illustrated on the basis of a BIC in the data (transmission data F2). As described above, data equivalent to eight blocks transmitted from the D-GPS data broadcasting station are inputted to the block synchronous circuit and the frame synchronous circuit shown in FIG. 2 during the periods of T7 through T14. On the other hand, during the other periods, data of the VICS data broadcasting station are inputted to the block synchronous circuit and the frame synchronous circuit. Further, timing of detecting a BIC by the BIC detection circuit 105 is timing of data (F1) transmission in the case of the reception of data from the VICS data broadcasting station and is timing of data (F2) transmission in the case of the reception of data from the D-GPS data broadcasting station (receiving data).

In the block synchronization determination protecting circuit 107, the number of forward protection N is set to two and the number of backward protection M is set to two, respectively. Thus, when the receiving frequency is switched from the VICS data broadcasting station to the D-GPS data broadcasting station, block synchronization of the VICS data broadcasting station is lost at the period of T9 and block synchronization of the D-GPS data broadcasting station is established at the next period of T10. Therefore, an output BL becomes 0 at the period of T9 and 1 at the period of T10. As the receiving frequency is returned from the D-GPS data broadcasting station to the VICS data broadcasting station at the period of T15, block synchronization of the D-GPS data broadcasting station is lost at the period of T16 and block synchronization of the VICS data broadcasting station is established at the period of T18. Meantime, the output BL becomes 0 at the period of T16 and 1 at the period of T18.

If the data counter 101 has been reset prior to the period of T0 at the data transmission timing of the VICS data broadcasting station, the data counter 101 will operate in such a manner that it synchronizes with the data transmission timing of the VICS data broadcasting station until the period of T8 and it is reset after counting 288. Since the data counter 101 will be reset by a pulse BP if an output BL is 0, block synchronization of the VICS data broadcasting station will be lost at the periods of T9 and T10 and an output BL becomes 0. A reset signal will then be generated in response to a BIC of the D-GPS data broadcasting station which is received at the period of T9. Thus, the data counter 101 will be reset before counting 288, whereby an output C1 will not be outputted. Similarly, block synchronization of the D-GPS data broadcasting station is lost and an output BL becomes 0 at the periods of T16 and T17. Thus, a reset signal is generated in response to a BIC of the VICS data broadcasting station which is received at the period of T17 and the data counter 101 is reset before counting 288, whereby an output C1 is not outputted. Incidentally, saw tooth waveform of an output of the data counter 101 shown in FIG. 4 indicates a change of counted value of the data counter 101. More specifically, it shows that the value will return to 0 after completion of 288 counts in the case of synchronization with the data transmission timing, but the value will return to 0 before the completion of 288 counts if a reset signal is generated.

Thus, since generation of an output C1 of the data counter 101 does not synchronize with the data transmission timing at every change of the receiving frequency (C1), a shortage of count arises at the block counter 110 (block counter) and a frame top signal (FCK) deviates from the frame top of a signal actually transmitted (a vertical dotted line in FIG. 4) (frame top). As a result, a block count for frame synchronization deviates and frame synchronization is lost.

SUMMARY OF THE INVENTION

The purpose of the present invention is to provide a synchronous circuit of an FM multiplex broadcasting receiver which can prevent loss of synchronization when receiving FM signals from a plurality of FM multiplex broadcasting stations.

According to the present invention, due to a counter which carries out a counting operation at timing of receiving multiplex data from each broadcasting station, it is possible to maintain block synchronization of not only a station from which the data are being received, but also a station from which no data are currently being received. In particular, when a single broadcasting radio receiver is used to receive multiplex data from two stations having different data transmission timing by switching the receiving frequencies, even though the receiving frequency is switched from one broadcasting station to the other broadcasting station only for a certain period, it is possible to accurately maintain frame synchronization of multiplex data of the former.

For example, a first counter and a second counter perform a counting operation at two different timings of receiving multiplex data and the respective counters maintain the counting operation. In response to a synchronization control signal, an output of the first counter is selected during a period of receiving multiplex data at one timing and an output of the second counter is selected during a period of receiving multiplex data at the other timing. Based on the output, block synchronization is detected. Further, detection of frame synchronization when receiving multiplex data at one timing is always performed based on an output of the first counter. Thus, it is possible to prevent loss of frame synchronization which may occur resulting from miscounting of block synchronization at every change of the broadcasting station.

Further, according to another aspect of the present invention, the first and second counters perform a counting operation at two different timings of receiving multiplex data, and when FM signals are switched, a synchronous condition of a block synchronous circuit is forcibly reset and the counting operation is synchronized with the timing of receiving FM multiplex data which are represented by FM signals switched to one counter. Thus, without impeding counting operation of the other counter, the counting operation of one counter can be synchronized with timing of receiving the FM multiplex data. Since detection of frame synchronization when receiving FM multiplex data at the other timing is always performed based on an output of the other counter, it is possible to prevent a step-out of frame synchronization which may occur resulting from miscounting of block synchronization at every change of the broadcasting station.

Further, it is possible to maintain frame synchronization more reliably by suspending the detection of frame synchronization while receiving data from the other broadcasting station.

DESCRIPTION OF THE PREFERRED EMBODIMENTS

First Embodiment

Figure 5:
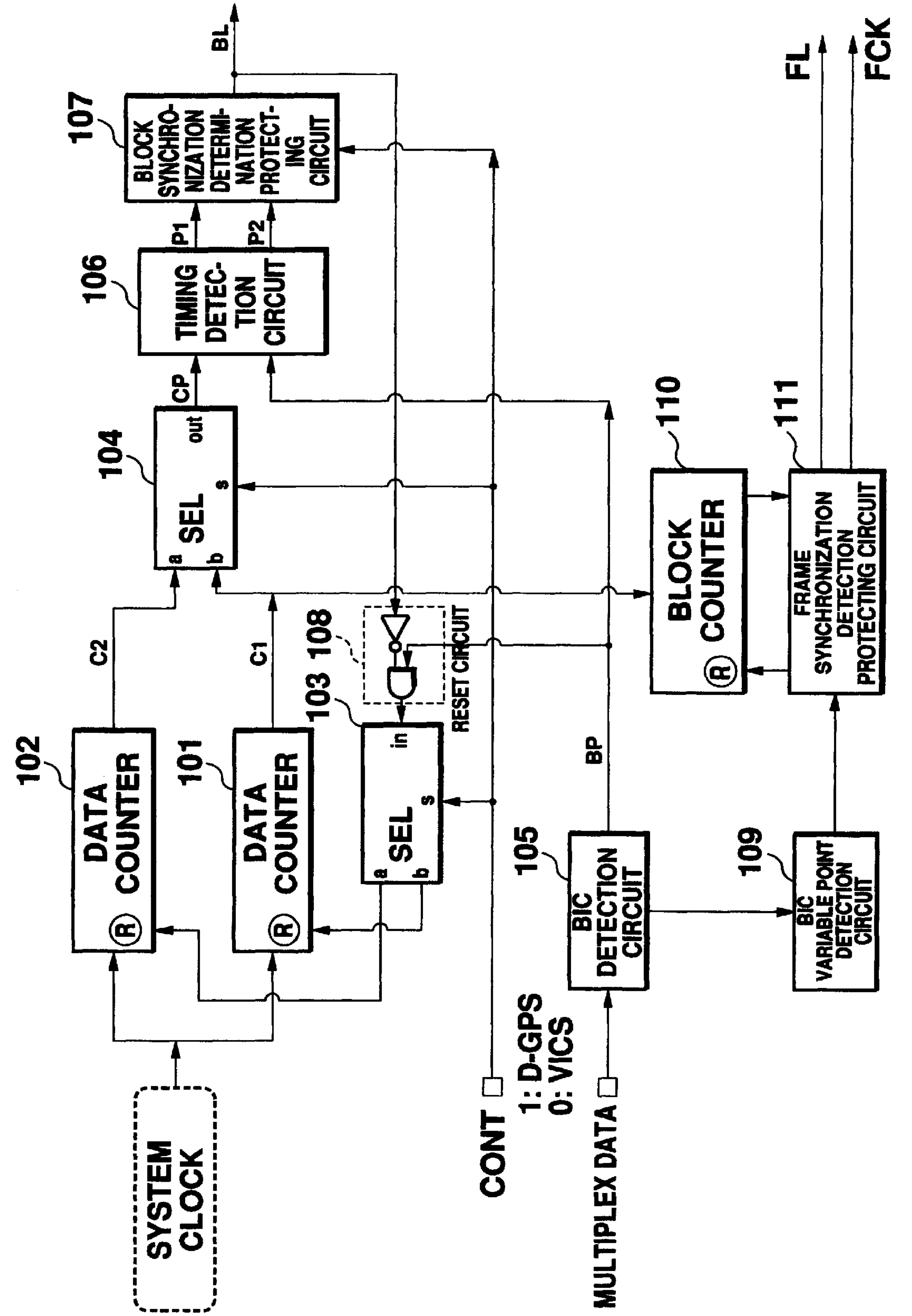
FIG. 5 is a block diagram showing a first embodiment of the present invention.

FIG. 5 shows a block synchronous circuit and a frame synchronous circuit according to a first embodiment of the present invention. A data counter 102 is a 288 centesimal counter for block synchronization like a data counter 101. The data counter 102 counts a system clock of 16 kHz and generates a pulse C2 at every block, namely, at an interval of 18 ms. Incidentally, similarly to the case of the data counter 101, the data counter 102 is reset when a BIC is detected by a BIC detection circuit 105 while block synchronization is asynchronous. A selector 103 will output an input "in" to the data counter 102 through an output terminal "a" if a control signal input "s" is 1, and will output the input "in" to the data counter 101 through an output terminal "b" if the control signal input "s" is 0. A selector 104 will select an input "a," namely, an output pulse C2 if the control signal input "s" is 1, and will output an input "b," namely, an output pulse C1 if the control signal input "s" is 0. A first reset signal generation circuit 108 generates a reset signal in response to detection of a BIC when an asynchronous condition (BL=0) is determined by a block synchronization determination protecting circuit 107. The reset signal is inputted into one data counter via the selector 103, and the BIC detection circuit 105 is initially synchronized with the data counter 101 or the data counter 102. A control signal CONT is a signal to be switched in accordance with a change of the receiving frequency. The control signal CONT becomes 0 at the time of receiving data from the VICS data broadcasting station, and becomes 1 at the time of receiving data from the D-GPS data broadcasting station. The control signal CONT controls the selectors 103 and 104.

If the control signal CONT is 0, operation of the circuits will be the same as that of the conventional block synchronous circuit and frame synchronous circuit. More specifically, an output C1 of the data counter 101 becomes a comparison signal CP of timing detection circuit 106 which is compared with an output BP of the BIC detection circuit 105. It also becomes a count signal of a block counter 110 for detecting frame synchronization. While block synchronization is lost (BL=0), the data counter 101 is reset in response to a BIC detection output BP, and VICS data are initially synchronized with counting operation of the data counter 101. Thus, block synchronization is established from the beginning.

On the other hand, if the control signal CONT is 1, an output C2 of the data counter 102 will be a comparison signal CP of the timing detection circuit 106 which is compared with an output BP of the BIC detection circuit 105. While block synchronization is lost (BL=0), the data counter 102 is reset in response to a BIC detection output BP, and D-GPS data are initially synchronized with the counting operation of the data counter 102.

Operation of FIG. 5 will subsequently be described with reference to a timing chart shown in FIG. 6. Incidentally, similarly to the conventional case, it is assumed that the number of backward protection M of the block synchronous circuit is two, the number of forward protection N of the block synchronous circuit is two, the number of backward protection X of the frame synchronous circuit is two, the number of forward protection Y of the frame synchronous circuit is eight, a station whose receiving frequency is F1 is the VICS data broadcasting station, and a station whose receiving frequency is F2 is the D-GPS data broadcasting station. In receiving data from the D-GPS data broadcasting station, consecutively received data equivalent to two blocks can secure a practically sufficient error rate simply by a horizontal error correction of the blocks, thereby enabling demodulation and reproduction of the D-GPS data. Therefore, assuming that the D-GPS data are received from the D-GPS data broadcasting station at the periods of T12 and T13 shown in FIG. 6, the receiving frequency of the D-GPS data broadcasting station will be switched during the periods of T7 through T14 (receiving frequency). Further, timing of data transmission from the VICS data broadcasting station is illustrated on the basis of a BIC in the data (transmission data F1). Similarly, timing of data transmission from the D-GPS data broadcasting station is illustrated on the basis of a BIC in the data (transmission data F2). As described above, data equivalent to eight blocks transmitted from the D-GPS data broadcasting station are inputted to the block synchronous circuit and frame synchronous circuit shown in FIG. 5 during the periods of T7 through T14. On the other hand, during the other periods, data of the VICS data broadcasting station are inputted to the block synchronous circuit and frame synchronous circuit. Further, timing of detecting a BIC by the BIC detection circuit 105 is data (F1) reception timing in the case of the VICS data broadcasting station, and is data (F2) reception timing in the case of the D-GPS data broadcasting station (receiving data).

The data counter 101 will be reset if a control signal CONT is 0 and an output BL is 0 (asynchronous condition). In this embodiment, it is reset prior to the period of T0 and its counting operation is synchronized with the timing of receiving data from the VICS data broadcasting station. Further, the data counter 102 will be similarly reset if a control signal CONT is 1 and an output BL is 0. It will be reset prior to the period T0 and its counting operation will be synchronized with the timing of receiving data from the D-GPS data broadcasting station. Saw tooth waveform of outputs C1 and C2 of the data counter 101 and the data counter 102 shows a change of each counted value, and the value returns to 0 after completion of counting 288.

Figure 1:
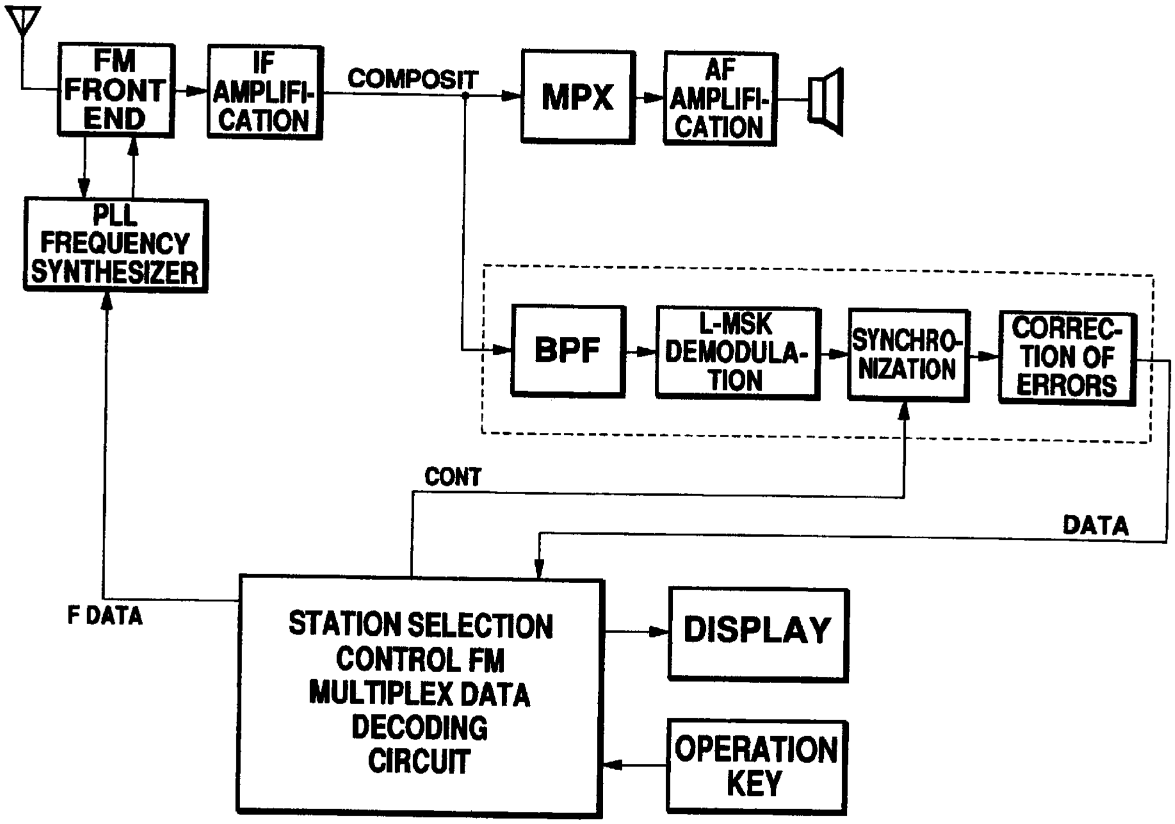
Fig. 1 PRIOR ART
FIG. 1 is a block diagram showing an FM multiplex broadcasting radio receiver.
Figure 2:
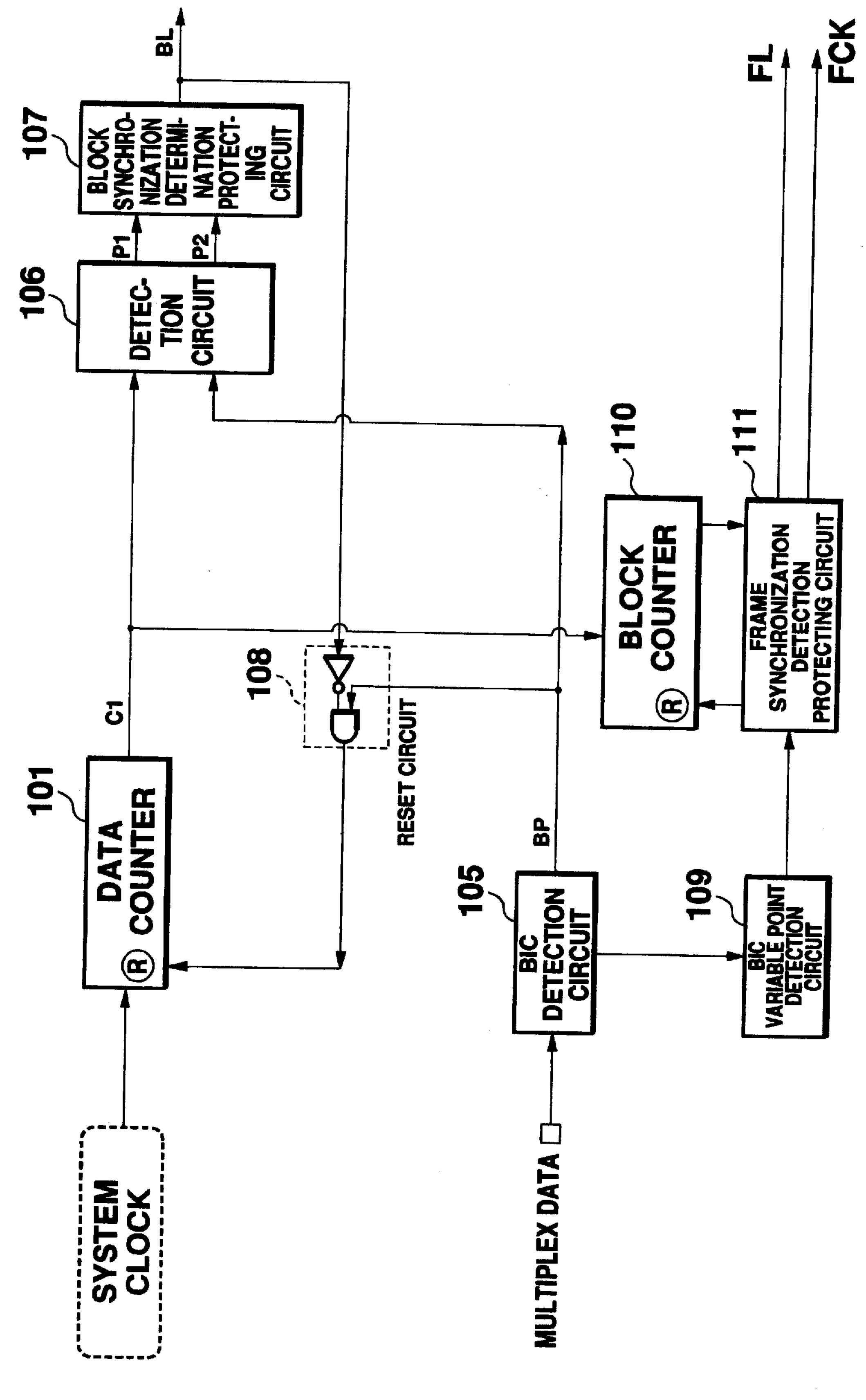
Fig. 2 PRIOR ART
FIG. 2 is a block diagram showing a conventional example.

Before the period of T7, circuits shown in FIG. 5 carry out operation similarly to the conventional example of FIG. 1 and timing of data reception is the same as timing of receiving the VICS data. Further, an output C1 of the data counter 101 has already been selected, timing of generating the output C1 coincides with timing of generating an output BP at the time of detection of a BIC in the VICS data, and an output BL of the block synchronization determination protecting circuit 107 is 1 which represents a synchronous condition. Further, an output C1 of the data counter 101 is inputted to the block counter 110 and accurate detection of frame synchronization is carried out. During this period, the data counter 102 performs the counting operation synchronizing with reception of D-GPS data.

When the receiving frequency is switched from the VICS data broadcasting station to the D-GPS data broadcasting station at the period of T7, timing of data reception is switched to timing of receiving D-GPS data. An output C2 of the data counter 102 is selected in response to a control signal CONT, and the BIC detection circuit 105 outputs an output BP corresponding to a variable point of a BIC in the D-GPS data. Since the counting operation of the data counter 102 is synchronized with timing of receiving D-GPS data, in the timing detection circuit 106, both the timing of an output C2 and an output BP coincide, and the output BL is still 1 which represents a synchronous condition {period of block synchronization (BL)}. Due to the output BL, generation of a reset signal from the first reset signal generation circuit 108 is prohibited, and the data counter 102 is not reset and continues the counting operation which is synchronized with the reception of D-GPS data (C2). Afterward, during the periods of T8 through T13, both the timing of generating an output C2 of the data counter 102 and an output BP coincide, so that the output BL is kept at 1. Incidentally, during the periods of T7 through T14, the first rest signal generation circuit 108 is connected to a reset terminal R of the data counter 102 and the data counter 101 is not reset in the middle of counting, whereby the data counter 101 can continue counting as it is synchronized with the reception of VICS data and detection of frame synchronization is continuously performed based on an output C1. Thus, no shortage of count arises at the block counter 110 (block count).

Afterward, when the receiving frequency returns from the D-GPS data broadcasting station to the VICS data broadcasting station at the period of T14, the timing of data reception is switched to the timing of receiving the VICS data. A control signal CONT becomes 0, an output C1 of the data counter 101 is selected, and the BIC detection circuit 105 outputs an output BP corresponding to a variable point of a BIC in the VICS data (receiving data). Since the counting operation of the data counter 101 is synchronized with the reception of VICS data, in the timing detection circuit 106, both the timing of an output C1 and an output BL coincide and an output BL is kept at 1 which represents a synchronous condition (block synchronization). Due to an output BL, prohibition of generation of a reset signal from the first reset signal generation circuit 108 is maintained, and the data counter 101 is not reset and continues counting as it is synchronized with the reception of VICS data (C1). Even after the period of T14, the data counter 101 is not reset in the course of counting as described above and is synchronized with the reception of VICS data, whereby the block counter 110 can continue counting operation without causing a shortage of count based on an output C1 (C1 and block counter). Thus, the block counter 110 performs a counting operation which is synchronized with the frame and it is possible to have the frame synchronization detection protecting circuit 111 output a frame top signal FCK which is synchronized with a frame top (frame top FCK).

Further, after the period of T14, the reset terminal R of the data counter 102 is rendered to be off by the selector 103 and therefore the data counter 102 is not reset. Thus, the data counter 102 can continue counting the operation which is synchronized with the reception of the D-GPS data (C2).

Therefore, the data counters 101 and 102 always perform counting operation at the respective timing of receiving the VICS and D-GPS data, and these counters are not reset in the middle of counting. Thus, once these data counters 101 and 102 are synchronized with the respective timing of receiving data from the VICS data broadcasting station and the D-GPS data broadcasting station, a BIC in the data received and an output CP of the selector 104 always coincide, and unless the BIC disappears or is falsely detected more than the number of forward protection N, block synchronization will not be lost even though the VICS data broadcasting station is switched to the D-GPS data broadcasting station, and vice versa. Thus, a frame top signal (FCK) can be reconciled with a top of the transmission frame actually transmitted, whereby it is possible to eliminate a conventional problem that frame synchronization is lost in a circuit due to slippage of block count for the frame synchronization.

Incidentally, during the periods of data reception from the D-GPS data broadcasting station (T7 through T14), a variable point of a BIC in the D-GPS data is inputted to the BIC variable point detection circuit 109. However, if the number of forward protection of the frame synchronization detection protecting circuit 111 is larger than the number of data to be received during the periods, frame synchronization will not be lost in the VICS data broadcasting station.

Figure 7:
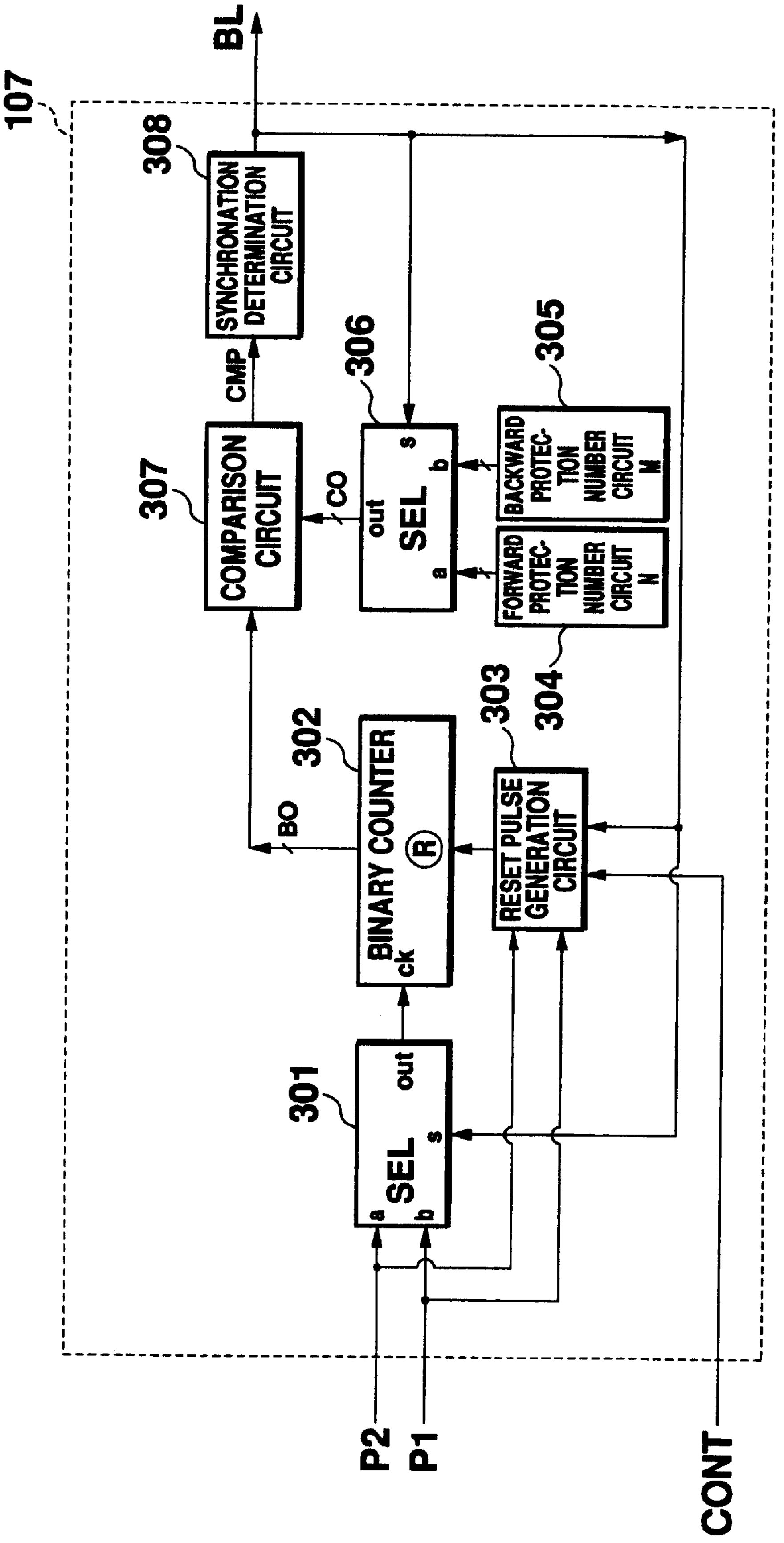
FIG. 7 is a block diagram showing an actual circuit of the block synchronization determination protecting circuit 107 shown in FIG. 5.

FIG. 7 is a detailed circuit diagram of the block synchronization determination protecting circuit 107. A selector 301 selectively outputs an accord pulse P1 or a disaccord pulse P2 of the timing detection circuit 106 at the time of detecting a BIC. More specifically, it outputs the pulse P2 when block synchronization is synchronous (BL=1), and outputs the pulse P1 when block synchronization is asynchronous (BL=

0). Taking a pulse P1 or a pulse P2 as a clock, a binary counter 302 counts the number of accord or disaccord. While block synchronization is synchronous, it counts disaccord pulses P2. On the other hand, while block synchronization is asynchronous, it counts accord pulses P1. A reset pulse generation circuit 303 is used for resetting the binary counter. The reset pulse generation circuit 303 will reset the binary counter 302 if an accord pulse P1 is outputted while block synchronization is synchronous, if a disaccord pulse P2 is outputted while block synchronization is asynchronous, and if a control signal CONT changes. When disaccord pulses P2 are consecutively counted prescribed N times, the number of forward protection N for detecting that block synchronization changes from a synchronous condition to an asynchronous condition is set to a forward protection number circuit 304. When accord pulses P1 are consecutively counted prescribed M times, the number of backward protection M for detecting that block synchronization changes from an asynchronous condition to a synchronous condition is set to a backward protection number circuit 305. A selector 306 will selectively output the number of forward protection N if block synchronization is synchronous (BL=1) and the number of backward protection M if block synchronization is asynchronous (BL=0). A comparison circuit 307 compares a counted value BO of the binary counter 302 with the number of forward protection N or the number of backward protection M which is an output CO of the selector 306. If the counted value BO is equal to or larger than the number of either protection (BO≧CO), an output CMP will be 1, and if the counted value BO is smaller than the number of either protection, the output CMP will be 0. A synchronization determination circuit 308 performs determination of synchronization based on an output CMP and a present BL signal. More specifically, the determination is such that if an output CMP becomes 1 while an output BL is 1 (block synchronization is synchronous), the output BL will be 0 (block synchronization is asynchronous), whereas if an output CMP becomes 1 while an output BL is 0 (block synchronization is asynchronous), the output BL will be 1 (block synchronization is synchronous).

Here, since a control signal CONT is inputted to the reset pulse generation circuit 303, the binary counter 302 is reset each time the control signal CONT is switched. Thus, after switching a station from which data are received, counting of the number of accord pulses or disaccord pulses is resumed from the beginning, whereby it is possible to prevent false determination of block synchronization which may occur immediately after the station is switched.

According to the present invention, due to the counter which performs a counting operation at the respective timing of receiving multiplex data from a plurality of broadcasting stations, it is possible to maintain block synchronization of not only a station from which the data are being received, but also a station from which no data are being received at present. In particular, when a single broadcasting radio receiver is used to receive multiplex data from two stations having different data transmission timing by switching the receiving frequency, even though the receiving frequency is switched from one station to the other station only for a certain period, it is possible to accurately maintain frame synchronization of multiplex data of the former.

Second Embodiment

Next, a device according to a second embodiment will be described. In this device, D-GPS data are obtained from a plurality of D-GPS data broadcasting stations having different frequencies.

Figure 8:
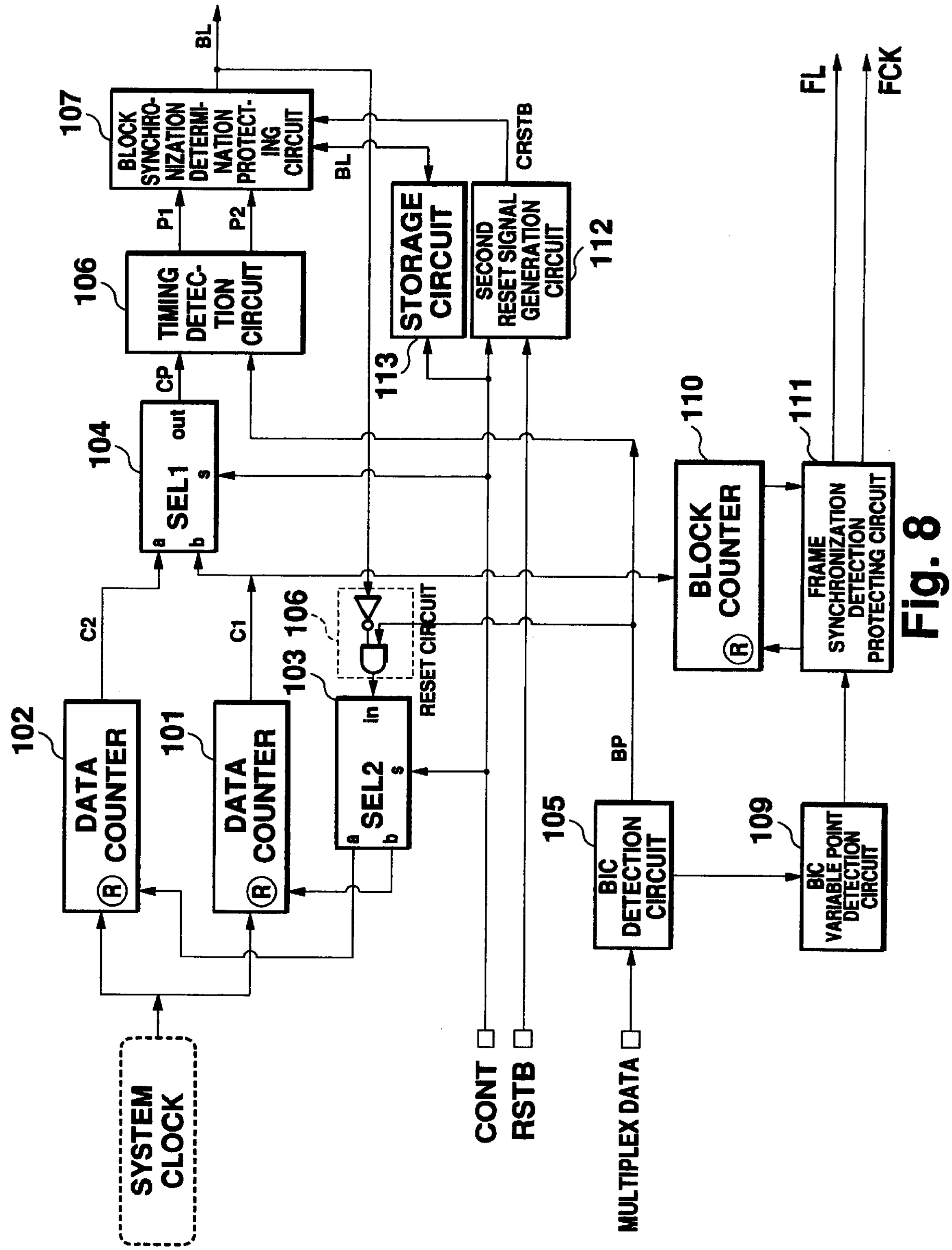
FIG. 8 is a block diagram showing a second embodiment of the present invention.

FIG. 8 shows the constitution of a device according to the second embodiment. The overall constitution of the device according to the second embodiment is almost the same as that of the device according to the first embodiment. However, it has additional features, such as a second reset signal generation circuit 112 and a storage circuit 113. The difference between the first embodiment and the second embodiment will be subsequently described.

The second reset signal generation circuit 112 generates a second reset signal CRSTB for resetting the block synchronization determination protecting circuit 107 in order to invalidate a synchronous condition detected. When a first reset signal RSTB is 1, the second reset signal CRSTB is generated. The first reset signal RSTB is outputted when the VICS data broadcasting station is switched to the D-GPS data broadcasting station. In other words, when a control signal CONT rises from 0 to 1, the first reset signal RSTB is outputted. Further, a control signal CONT is inputted to the second reset signal generation circuit 112 and generation of a second reset signal CRSTB is prohibited when the control signal CONT is 0. The storage circuit 113 temporarily stores a synchronous condition (BL) detected by the block synchronization determination protecting circuit 107, and when a condition of the control signal CONT changes, the storage circuit 113 stores the present condition and also outputs the previous synchronous condition (BL) stored to the block synchronization determination protecting circuit 107. Thus, when the station from which data are received is switched from the D-GPS data broadcasting station to the VICS data broadcasting station, it is possible to force the block synchronization determination protecting circuit 107 to set the previous synchronous condition of the VICS data broadcasting station as the results of the determination, whereby the block synchronous condition of the VICS data broadcasting station can be maintained even though the station is switched.

Figure 9:
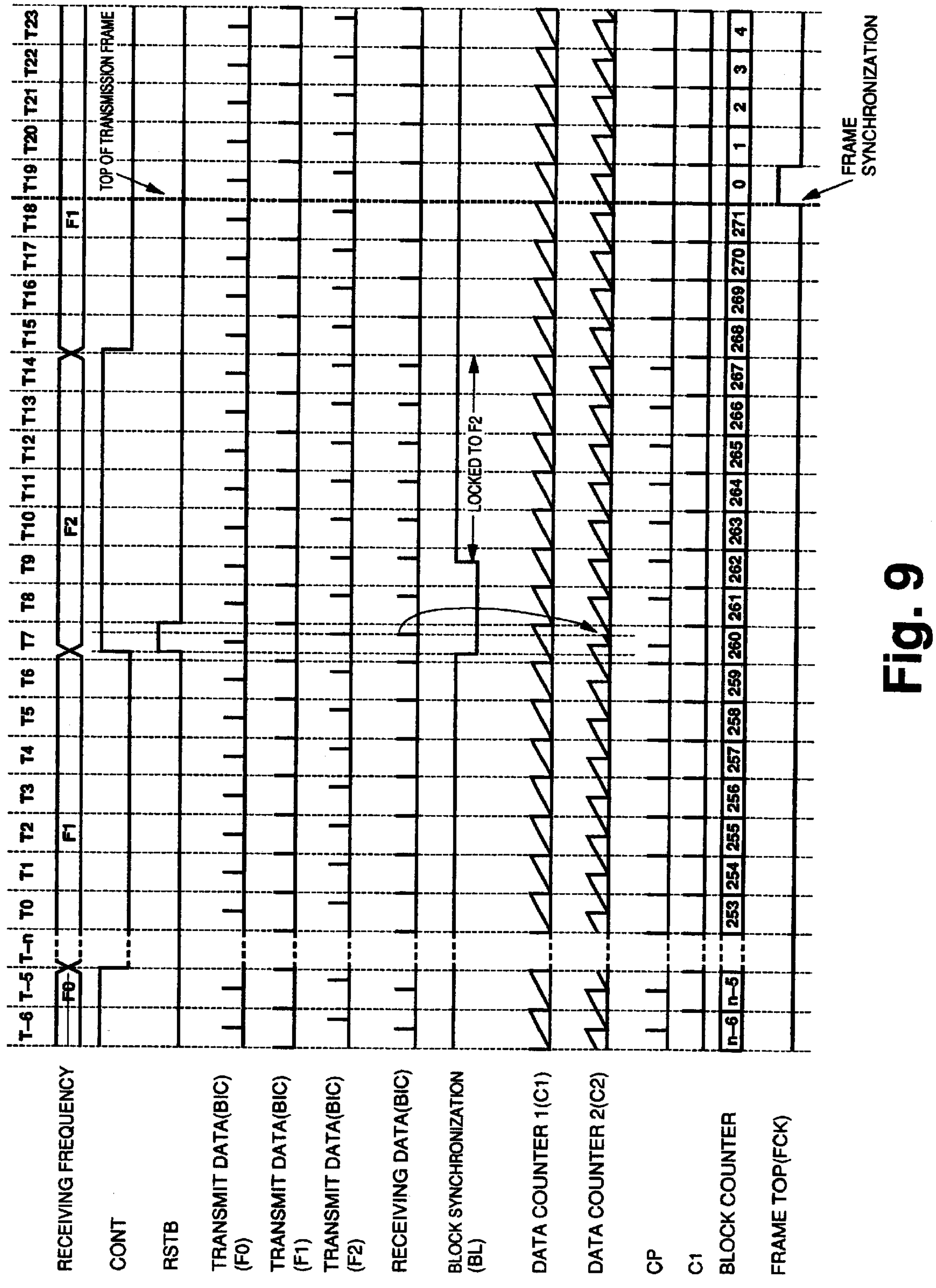
FIG. 9 is a timing chart for the description of operation of FIG. 8.

Operation of FIG. 8 will be subsequently described with reference to a timing chart shown in FIG. 9. Incidentally, various conditions are similar to those of the first embodiment. However, in this example, it is assumed that a station whose receiving frequency is F0 is a D-GPS station from which data are previously received, a station whose receiving frequency is F1 is the VICS data broadcasting station, and a station whose receiving frequency is F2 is the D-GPS data broadcasting station. In order to obtain D-GPS data from the D-GPS data broadcasting station at the periods of T12 and T13 shown in FIG. 9, the receiving frequency is switched to that of the D-GPS data broadcasting station during the periods of T7 through T14. Further, data transmission timing of the VICS data broadcasting station is illustrated on the basis of a BIC in the data (transmission data F1). Similarly, the respective data transmission timing of the D-GPS station and the D-GPS data broadcasting station is illustrated on the basis of BICs in the respective data (transmission data F0 and F2). As described above, data equivalent to eight blocks transmitted from the D-GPS data broadcasting station are inputted to the block synchronous circuit and the frame synchronous circuit shown in FIG. 8 during the periods of T7 through T14. On the other hand, during the other periods, data of the VICS data broadcasting station are inputted to the block synchronous circuit and the frame synchronous circuit described above. Incidentally, before the period of T5, data of the D-GPS station are inputted to the block synchronous circuit and the frame synchronous circuit (receiving frequency). Further, timing of detecting a BIC by the BIC detection circuit 105 is timing of data (F0) transmission in the case of reception of data from the D-GPS station. The timing of detecting a BIC is timing of data (F1) transmission in the case of the reception of data from the VICS data broadcasting station. Also, the timing of detecting a BIC is the timing of data (F2) transmission in the case of the reception of data from the D-GPS data broadcasting station.

The data counter 101 is reset when a control signal CONT is 0 and an output BL is 0 (asynchronous condition). In this embodiment, it is reset prior to the period of T5 and performs counting operation which is synchronized with the timing of receiving data from the VICS data broadcasting station. Further, similarly, the data counter 102 is reset when a control signal CONT is 1 and an output BL is 0. It is reset prior to the period of T5 and performs counting operation which is synchronized with the timing of receiving data from the D-GPS station.

When the receiving frequency is switched from the VICS data broadcasting station to the D-GPS data broadcasting station at the period of T7, timing of data reception is switched to the timing of receiving data from the D-GPS data broadcasting station. Based on a control signal CONT, an output C2 of the data counter 102 is selected (CP), and the BIC detection circuit 105 outputs an output BP corresponding to a variable point of a BIC in the D-GPS data. However, since the data counter 102 is synchronized with the D-GPS station at this point, both the timing of generating an output CP and an output BP disaccord.

When a control signal CONT rises to 1, the storage circuit 113 stores a synchronous condition of the VICS data broadcasting station detected by the block synchronization determination protecting circuit 107 and also the condition previously stored is written into the block synchronization determination protecting circuit 107. After the control signal CONT rises, a first reset signal RSTB is inputted to the second reset signal generation circuit 112 (RSTB). If the first reset signal RSTB is inputted when the control signal CONT is 1, a second reset signal CRSTB will be generated from the second reset signal generation circuit 112. In response to the second reset signal CRSTB, the synchronous condition BL written from the storage circuit 113 is reset to 0. Incidentally, if generation of the second reset signal CRSTB is delayed until the control signal CONT rises as described above, the synchronous condition can be reset without fail.

Subsequently, if an output BL of the block synchronization determination protecting circuit 107 is 0 and the BIC detection circuit 105 detects a first BIC of the D-GPS data broadcasting station, in response to a pulse "a" under reception of data, the first reset signal generation circuit 108 will generate a first reset signal and the data counter 102 will be reset. This means that the data counter 102 has been synchronized with the D-GPS data broadcasting station. At the period of T8, both the timing of generating an output C2 of the data counter 102 and an output BP of the BIC detection circuit 105 coincide. When both the timing of generating an output of C2 and an output BP coincide again at the period of T9, the output BL becomes 1. Since both the timing of generating an output C2 of the data counter 102 and an output BP coincide during the periods of T10 through T14, the output BL is kept at 1. Further, during the periods of T7 through T14, the first reset signal generation circuit 108 is connected to a reset terminal R of the data counter 102 and the data counter 101 is not reset during the course of counting. Thus, the data counter 101 continues the counting operation which is synchronized with the reception of VICS data and detection of frame synchronization is continued based on an output C1. Consequently, a shortage of count does not arise at the block counter 110.

If the receiving frequency returns from the D-GPS data broadcasting station to the VICS data broadcasting station at the period of T15, timing of data reception will be switched to the VICS data reception timing. A control signal CONT will become 0, an output C1 of the data counter 101 will be selected, and the BIC detection circuit 105 will output an output BP corresponding to a variable point of a BIC in the VICS data (receiving data). Since the counting operation of the data counter 101 is synchronized with the reception of VICS data, in the timing detection circuit 106, both the timing of an output C1 and an output BP coincide.

Further, at the period of T15, the storage circuit 113 stores a synchronous condition (BL=1) of the block synchronization determination protecting circuit 107 in response to a control signal CONT and then writes into the block synchronization determination protecting circuit 107 a synchronous condition (BL=1) (synchronous condition at T7) stored previously. At the period of T15, the station from which data are received is switched from the D-GPS data broadcasting station to the VICS data broadcasting station and therefore no reset signal RSBT is generated, whereby the block synchronization determination protecting circuit 107 is not reset. Thus, the output BL is kept at 1 representing a synchronous condition (C2). Incidentally, even though a reset signal RSBT is outputted due to noise or a malfunction, since the control signal CONT is 0, generation of the reset signal RSBT is prohibited by the second reset signal generation circuit 112 and the block synchronization determination protecting circuit 107 is not reset.

Since generation of a first reset signal from the first reset signal generation circuit 108 is prohibited in response to an output BL, after the period of T15, the data counter 101 is not reset and continues counting operation which is synchronized with the reception of VICS data (C1). After the period of T14, the data counter 101 is not reset during the course of counting. Therefore, based on an output C1, the block counter 110 continues counting operation without causing a shortage of count. Thus, the block counter 110 performs a counting operation which is synchronized with the frame and it is possible to let the frame synchronization detection protecting circuit 111 output a frame top signal FCK which is synchronized with the frame top.

As described above, even though there are two or more D-GPS stations, a block counter for frame synchronization of the VICS data broadcasting station does not miscount and block synchronization of the D-GPS station switched can be immediately detected.

In the embodiment shown in FIG. 8, a reset signal RSTB is generated when the station from which data are received is switched from the VICS data broadcasting station to the D-GPS station. However, it is also preferable to have constitution such that a reset signal RSTB is generated only when a D-GPS station to be switched next differs from a station switched previously and the reset signal RSTB is not generated when the D-GPS station to be switched next is identical to the D-GPS station switched previously. Thus, when a D-GPS station to be switched is identical to a D-GPS station switched previously, without resetting the data counter 102 and with a synchronous condition of the D-GPS station being maintained, switching of the D-GPS station can be carried out.

Figure 10:
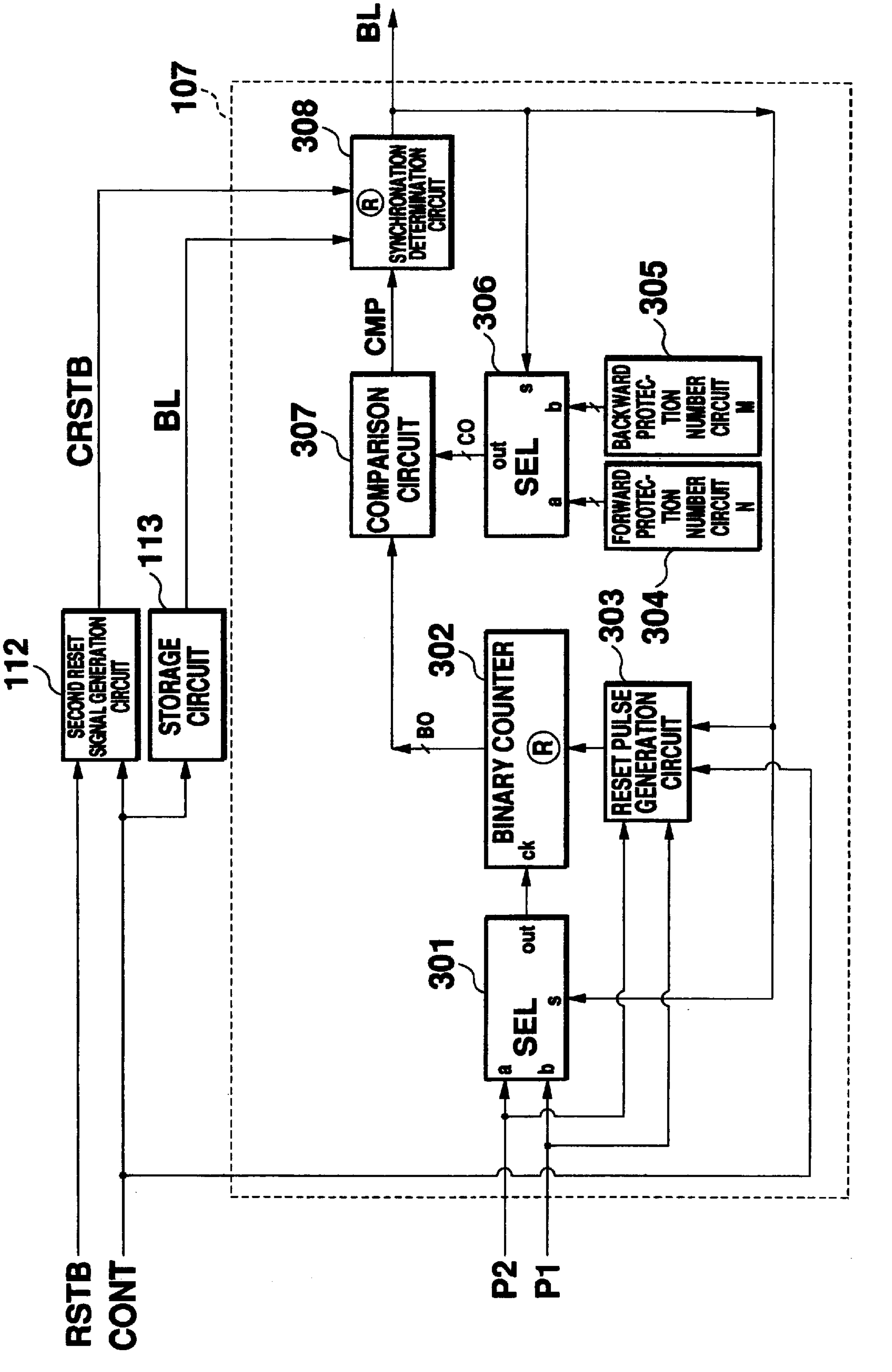
FIG. 10 is a block diagram showing an actual circuit of the block synchronization determination protecting circuit 107 shown in FIG. 8.

FIG. 10 is a detailed circuit drawing of the block synchronization determination protecting circuit 107 which has a similar constitution to the circuit according to the first embodiment shown in FIG. 7. Here, the synchronization determination circuit 308 performs determination of synchronization based on an output CMP and a present BL signal. More specifically, determination is such that if an output CMP becomes 1 while a BL signal is 1 (synchronous condition), the BL signal will be 0 (asynchronous condition), and if the output CMP becomes 1 while the BL signal is 0 (asynchronous condition), the BL signal will be 1 (synchronous condition).

In FIG. 10, a control signal CONT is inputted to the reset pulse generation circuit 303 and therefore the binary counter 302 is reset every time the control signal CONT is switched. Thus, after switching the station from which data are received, a counting operation of accord or disaccord pulses is resumed from the beginning and it is possible to prevent the false determination of block synchronization which may occur immediately after switching the station from which data are received. Further, in response to a change of the control signal CONT, a synchronous condition in the synchronization determination circuit 308 is stored in the storage circuit 113, the previous synchronous condition stored in the storage circuit 113 is written into the synchronization determination circuits 308, and the previous output BL is outputted from the synchronization determination circuit 308. Further, in response to a second reset signal CRSTB, the synchronization determination circuit 308 is forcibly reset and the output BL becomes 0.

Third Embodiment

Figure 11:
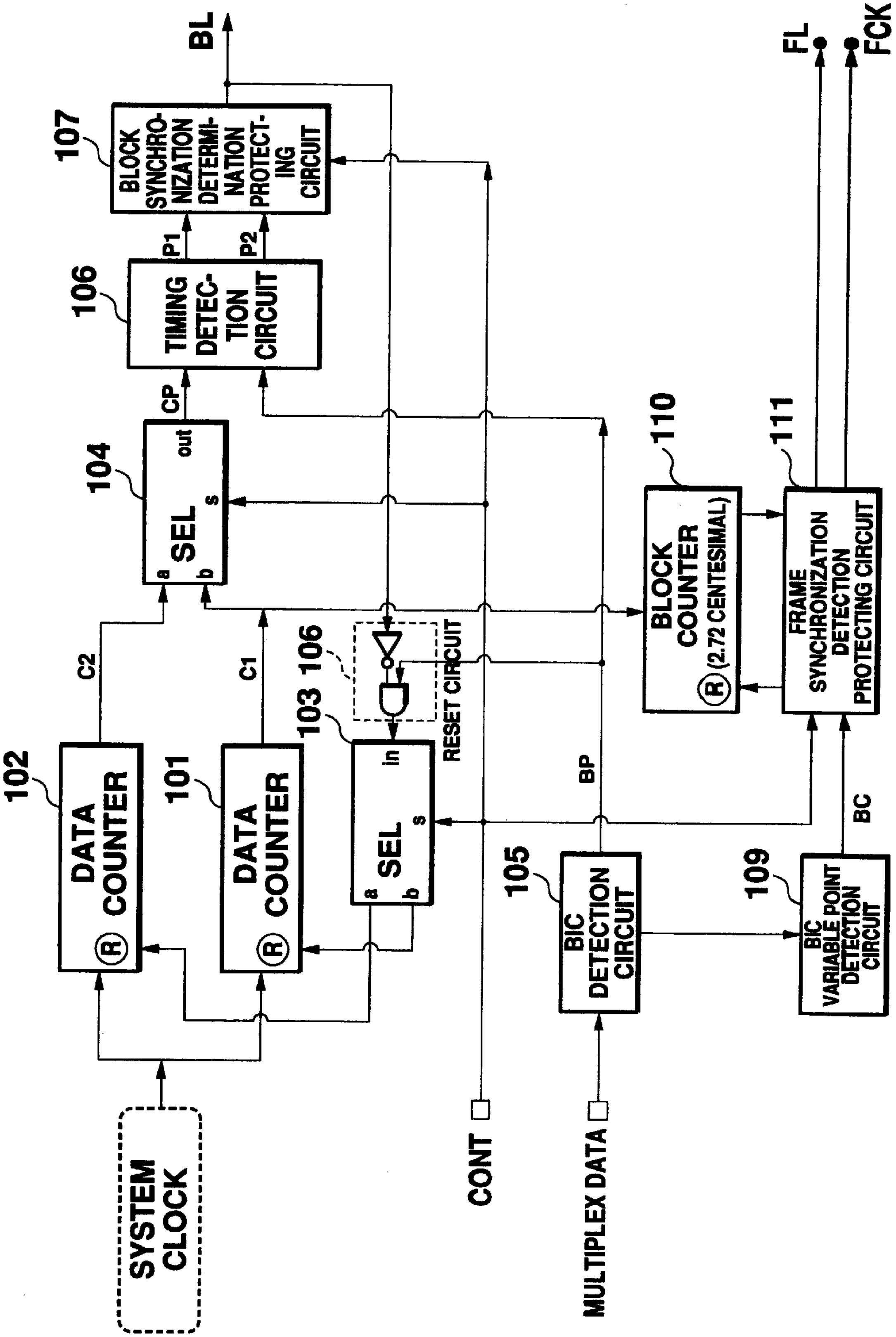
FIG. 11 is a block diagram showing a third embodiment of the present invention.

A device according to a third embodiment will be subsequently described. FIG. 11 shows a constitution of the device according to the third embodiment. The overall constitution of the device according to the third embodiment is almost the same as that of the device of the first embodiment. However, the device is characterized in that based on a control signal CONT, operation of protecting the detection of frame synchronization is suspended.

Figure 6:
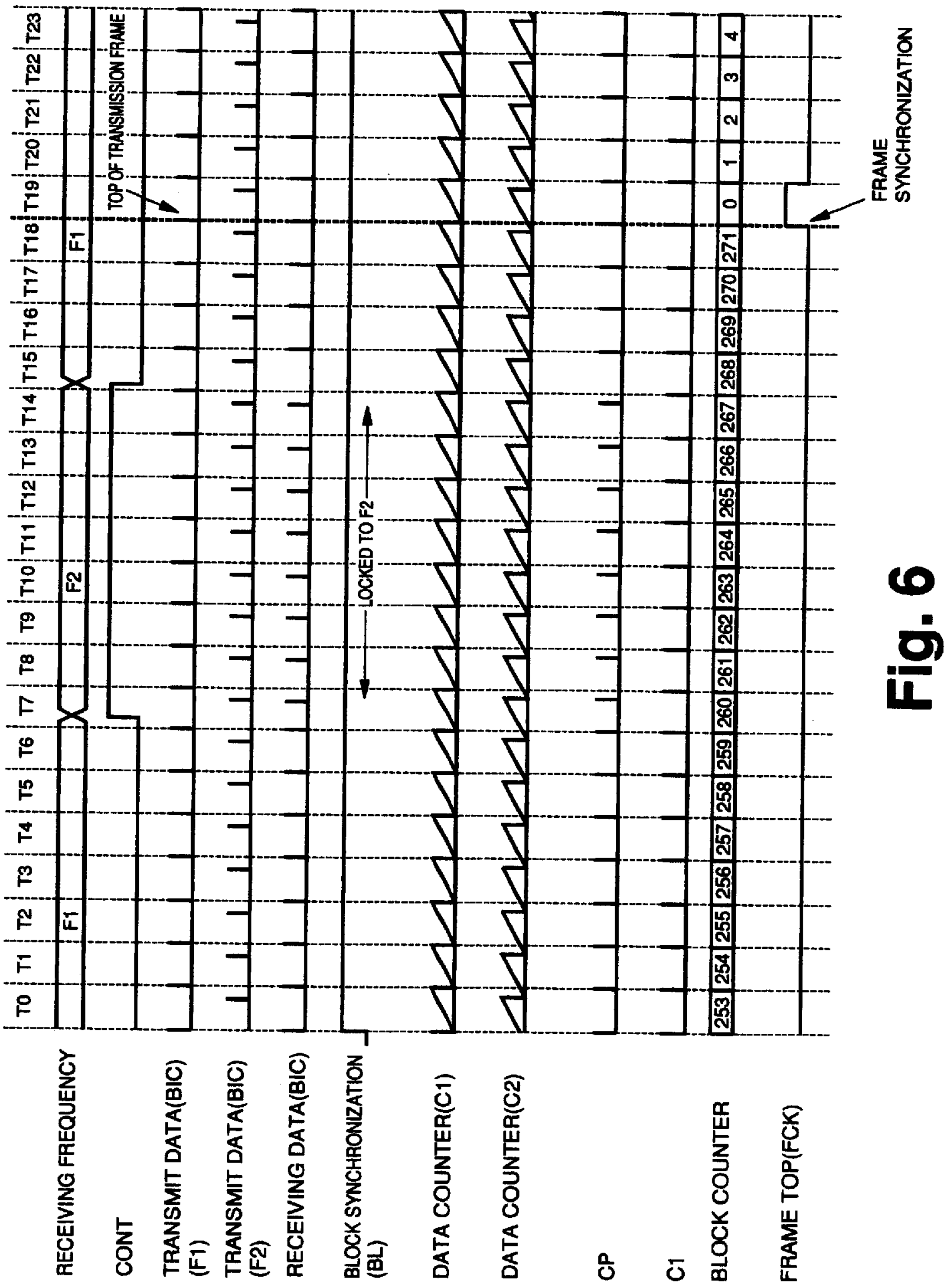
FIG. 6 is a timing chart for the description of operation of FIG. 5.
Figure 12:
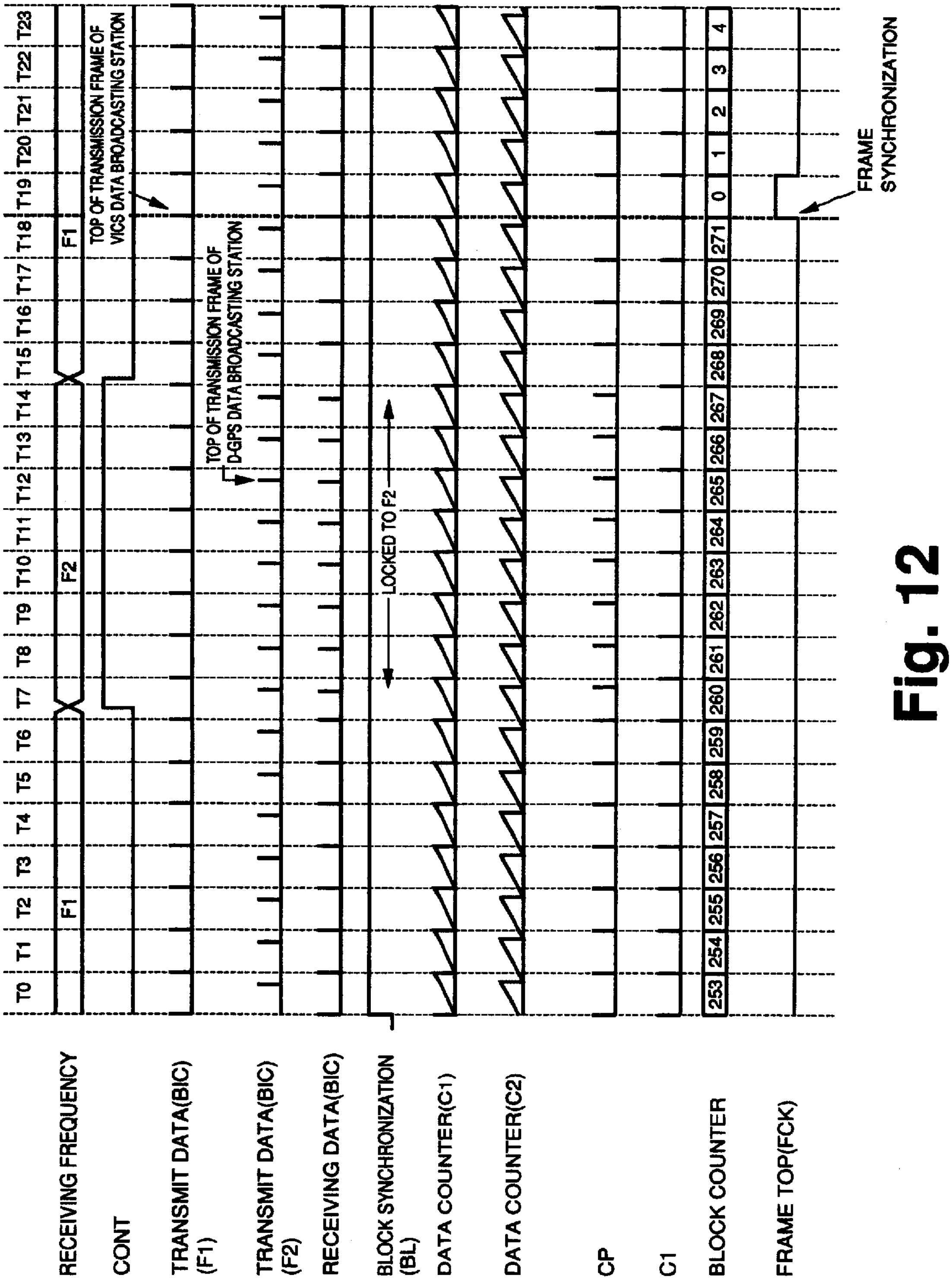
FIG. 12 is a timing chart for the description of operation of FIG. 11.

FIG. 12 is a timing chart showing operation under similar conditions to those of the first embodiment shown in FIG. 6. The overall operation is the same as that of the first embodiment. However, in this example, when the control signal CONT becomes 1, the protecting operation of the frame synchronization detection protecting circuit 111 is suspended. Thus, even though a BIC in the data of the D-GPS data broadcasting station changes and an output BC of the BIC variable point detection circuit 109 is generated while receiving data from the D-GPS data broadcasting station, the output BC is ignored by the frame synchronization detection protecting circuit 111. As a result, in the frame synchronization detection protecting circuit 111, the number of forward or backward protection at the period of T7 is held, and protection of frame synchronization of the VICS data broadcasting station based on a signal of the D-GPS data broadcasting station is not carried out.

Subsequently, when the receiving frequency returns from the D-GPS data broadcasting station to the VICS data broadcasting station at the period of T15, the data reception timing shown in FIG. 12 is switched to the timing of VICS data reception. A control signal CONT then becomes 0, an output C1 of the data counter 101 is selected, and an output BP corresponding to the variable point of a BIC in the VICS data is outputted from the BIC detection circuit 105. Since a counting operation of the data counter 101 is synchronized with the reception of VICS data, both the timing of an output C1 and an output BL coincide in the timing detection circuit 106 and the output BL is kept at 1 which represents a synchronous condition {block synchronization (BL)}. Due to the output BL, prohibition of the generation of a reset signal from the first reset signal generation circuit 108 is maintained and the data counter 101 is not reset and continues the counting operation which is synchronized with the reception of VICS data (C1). When the control signal CONT becomes 0, the frame synchronization detection protecting circuit 111 resumes protecting the detection of frame synchronization and starting from the number of protection held at the period of T7, detection of frame synchronization is carried out.

Even after the period of T15, the data counter 101 is not reset during the course of counting as described above and performs counting operation which is synchronized with the reception of VICS data. Thus, based on an output C1, the block counter 110 continues a counting without causing a shortage of count. Frame synchronization established before the station is switched to D-GPS data broadcasting station is also continuously protected. Thus, the block counter 110 can perform a counting operation which is synchronized with the frame and a frame top signal FCK which is synchronized with the frame top can be outputted from the frame synchronization detection protecting circuit 111.

As described above, by suspending operation of protecting the detection of frame synchronization of the VICS data broadcasting station when receiving data from the D-GPS data broadcasting station, the protecting operation based on a signal of the D-GPS data broadcasting station can be ignored, whereby it is possible to more reliably prevent frame synchronization from being lost.

Figure 3:
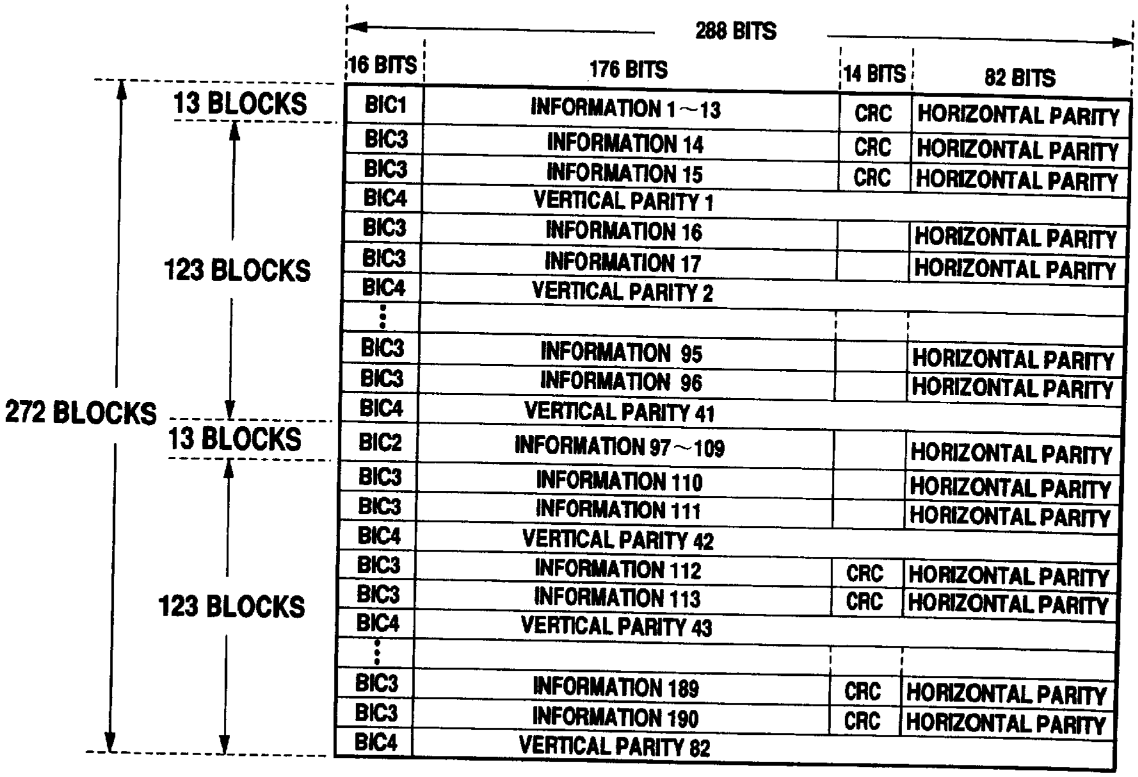
Fig. 3 PRIOR ART
FIG. 3 shows frame constitution of FM multiplex data.
Figure 4:
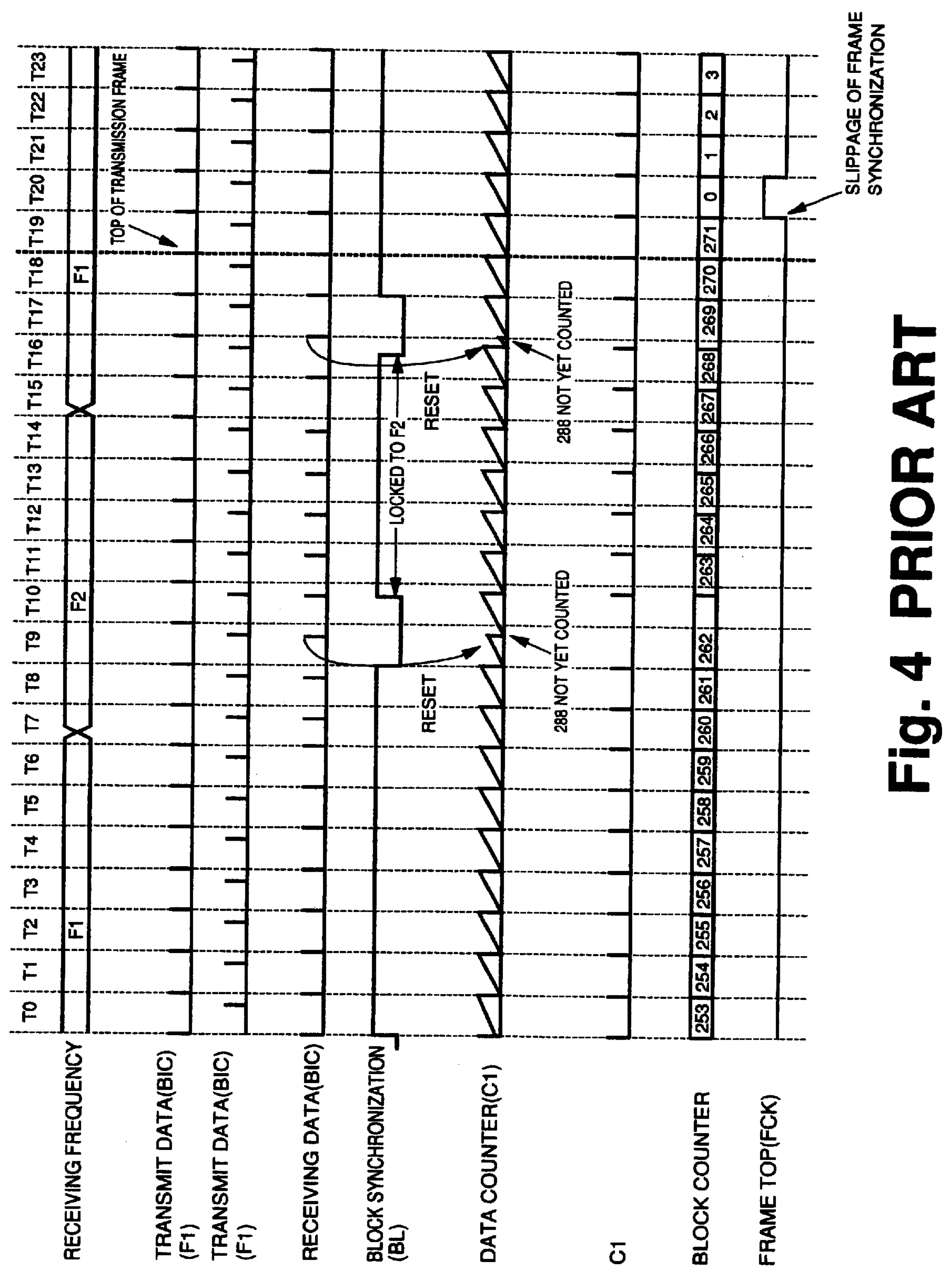
Fig. 4 PRIOR ART
FIG. 4 is a timing chart for the description of operation of FIG. 2.
Figure 13:
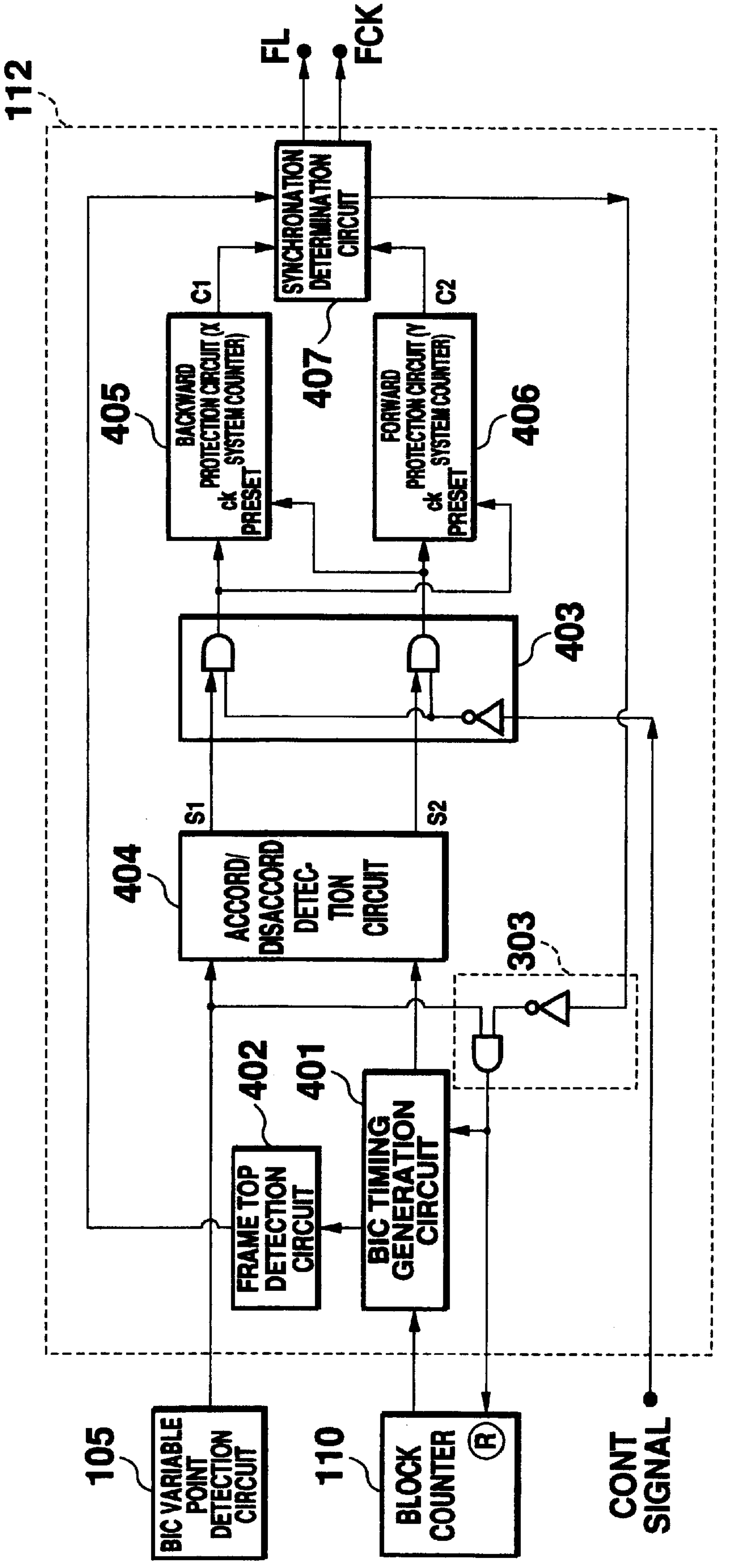
FIG. 13 is a block diagram showing an actual circuit of a frame synchronization detection protecting circuit 111 shown in FIG. 11.

FIG. 13 shows an actual circuit of the frame synchronization detection protecting circuit 111 shown in FIG. 11. Based on a counted value of the block counter 110, a BIC timing generation circuit 401 generates an output at such a timing that a BIC in the receiving data should make a prescribed change. A frame top detection circuit 402 detects the frame top of receiving data based on an output of the BIC timing generation circuit 401 and in the frame constitution of FIG. 3, the frame top is detected at the variable point from BIC 4 to BIC 1. A gate circuit 403 resets the BIC timing generation circuit 401 and the block counter 110 in response to an output of the BIC variable point detection circuit 109 when frame synchronization is an asynchronous condition. An accord/disaccord detection circuit 404 compares both the outputting timing of the BIC timing generation circuit 401 and the BIC variable point detection circuit 109. When these outputting timing coincide, the accord/disaccord detection circuit 404 outputs an accord pulse S1, and when these timing do not coincide, it outputs a disaccord pulse S2. When accord pulses S1 are continuously counted prescribed X times, a backward protection circuit 405 outputs an output C1 assuming that frame synchronization is established. When disaccord pulses S2 are continuously counted prescribed Y times, a forward protection circuit 406 outputs an output C2 assuming that frame synchronization steps out. Incidentally, the backward protection circuit 405 is preset by the disaccord pulse S2 and the forward protection circuit 406 is preset by an accord pulse S1. Thus, if one of the pulse S1 and pulse S2 is generated while the other pulse is generated, operation of protecting the other pulse will be cancelled. A synchronization determination circuit 407 outputs an output FL which is 1 representing a frame synchronous condition when an output C1 is outputted and outputs an output FL which is 0 representing a frame asynchronous condition when an output C2 is outputted. The synchronization determination circuit 407 also outputs a frame top signal FCK in response to an output of the frame top detection circuit 402.

A frame synchronization control circuit 408 cuts off an accord pulse S1 and a disaccord pulse S2 when a control signal CONT is 1 and permits these pulses S1 and S2 to have continuity when the control signal CONT is 0. Thus, a period control signal CONT of the VICS data broadcasting station becomes 0 and therefore the backward protection circuit 405 and the forward protection circuit 406 perform operation of protecting the detection of frame synchronization of the VICS data broadcasting station. Further, a period control signal CONT of the D-GPS station becomes 1 and therefore no signal is inputted to the backward protection circuit 405 and the forward protection circuit 406 and the counting conditions are maintained. Therefore, operation of protecting the detection of frame synchronization of the D-GPS data broadcasting station is suspended.

In the above description, the first, second, and third embodiments are separately described. However, it is also possible to appropriately combine the constitution of these embodiments, in particular, to have the constitution of both the second and third embodiments.

What is claimed is:

1. A synchronous circuit of an FM multiplex broadcasting receiver for receiving two or more FM signals, each of which includes FM multiplex data, said circuit comprising:

a system clock having clock pulses;

a first counter which performs a counting operation of the clock pulses synchronizing with first FM multiplex data;

a second counter which performs a counting operation of the clock pulses synchronizing with second FM multiplex data;

the first and second counters counting the clock pulses in cycles of predetermined counts to generate pulses for synchronizing with the first and second FM multiplex data;

a control signal for selecting a station of the first FM multiplex data or the second FM multiplex data; and a selection circuit for selecting an output of either the first counter or the second counter based on the control signal.

2. The circuit according to claim 1, said circuit further comprising:

a block identification code detection circuit for detecting a block identification code from either the first or the second FM multiplex data; and a block synchronization detection circuit for detecting whether or not the first counter or the second counter is synchronized with corresponding FM multiplex data by comparing a result of detection by the block identification code detection circuit with an output of either the first counter or the second counter outputted via said selection circuit.

3. The circuit according to claim 2, wherein if it is determined that the first counter or the second counter is not synchronized as a result of detection by said block synchronization detection circuit, the first counter or the second counter will be reset based on detection of a block identification code by the block identification code detection circuit.

4. The circuit according to claim 1, wherein based on an output of either said first counter or said second counter, frame synchronization of predetermined FM multiplex data is detected.

5. The circuit according to claim 2, wherein the first counter and the second counter count an identical reference clock.

6. The circuit according to claim 5, said circuit further comprising a frame synchronization detection circuit for detecting frame synchronization based on an output of the first counter.

7. The circuit according to claim 5, wherein said control signal is switched according to a change of a receiving frequency of said FM signal.

8. The circuit according to claim 5, wherein said reference clock has a frequency the same as or an integer times as much as a bit rate of said FM multiplex data.

9. The circuit according to claim 2, wherein said block synchronization detection circuit has a protection number counter for carrying out forward protection or backward protection in order to control a transition between a synchronous condition and an asynchronous condition in a result of detection, and said block synchronization detection circuit resets said protection number counter according to a change of a condition of said control signal.

10. The circuit according to claim 2, said circuit further comprising a reset signal generation circuit which generates a reset signal for forcibly resetting a detecting condition in said block synchronization detection circuit based on said control signal.

11. The circuit according to claim 10, said circuit further comprising a storage circuit which stores a detecting condition of said block synchronization detection circuit and also outputs a detecting condition already stored to said block detection circuit based on said control signal.

12. The circuit according to claim 11, wherein said reset signal generation circuit prohibits generation of said reset signal when said control signal is in a predetermined condition.

13. The circuit according to claim 1, said circuit further comprising a frame synchronization detection circuit which detects, based on an output of one of said first counter and said second counter, frame synchronization of FM multiplex data corresponding to the counter, wherein when said selection circuit selects the other counter which does not correspond to FM multiplex data whose frame synchronization is detected by the frame synchronization detection circuit, operation of said frame synchronization detection circuit is suspended.

14. The circuit according to claim 13, wherein said frame synchronization detection circuit has a forward or backward protection circuit for controlling a transition between a synchronous condition and an asynchronous condition in a result of detection, and when said the other counter is selected, protecting operation of said protection circuit is suspended.

* * * * *